(12) United States Patent
Lo

(10) Patent No.: US 10,601,519 B2
(45) Date of Patent: Mar. 24, 2020

(54) RECEIVER CIRCUIT WITH LOW POWER CONSUMPTION AND METHOD FOR REDUCING POWER CONSUMPTION OF RECEIVER SYSTEM

(71) Applicant: Generalplus Technology Inc., Hsinchu (TW)

(72) Inventor: Li Sheng Lo, Zhubei (TW)

(73) Assignee: GENERALPLUS TECHNOLOGY INC., Hsinchu (TW)

( * ) Notice: Subject to any disclaimer, the term of this patent is extended or adjusted under 35 U.S.C. 154(b) by 192 days.

(21) Appl. No.: 15/828,635

(22) Filed: Dec. 1, 2017

(65) Prior Publication Data

US 2018/0159634 A1 Jun. 7, 2018

(30) Foreign Application Priority Data

Dec. 5, 2016 (TW) ................ 105140054 A (51) Int. Cl.
| | |
|---|---|
| *H04B 10/60* | (2013.01) |
| *H04B 1/16* | (2006.01) |
| *G08C 23/04* | (2006.01) |
| *H04B 1/08* | (2006.01) |
| *G06F 1/3203* | (2019.01) |
| *H04B 10/69* | (2013.01) |
| *H04B 10/114* | (2013.01) |

(52) U.S. Cl.
CPC ........... *H04B 10/60* (2013.01); *G06F 1/3203* (2013.01); *G08C 23/04* (2013.01); *H04B 1/082* (2013.01); *H04B 1/16* (2013.01); *H04B 10/114* (2013.01); *H04B 10/69* (2013.01)

(58) Field of Classification Search
CPC ...... H04B 10/114; H04B 10/69; H04B 10/60; H04B 1/16; H04B 1/082; G08C 23/04; G06F 1/3203
See application file for complete search history.

(56) References Cited

U.S. PATENT DOCUMENTS

| | | | | |
|---|---|---|---|---|
| 6,230,277 | B1 * | 5/2001 | Nakaoka | G06F 1/3215 713/320 |
| 2004/0155860 | A1 * | 8/2004 | Wenstrand | G06F 1/3203 345/156 |
| 2005/0077998 | A2 * | 4/2005 | Denison | B60R 25/102 340/5.64 |
| 2008/0282100 | A1 * | 11/2008 | Chen | G06F 1/3203 713/322 |

FOREIGN PATENT DOCUMENTS

JP H07-250383 A * 9/1995 ............ H04Q 9/00

* cited by examiner

*Primary Examiner* — Jared Fureman
*Assistant Examiner* — Duc M Pham
(74) *Attorney, Agent, or Firm* — Muncy, Geissler, Olds & Lowe, P.C.

(57) ABSTRACT

A receiver circuit with low power consumption and a method for reducing power consumption of a receiver system are provided. The method for reducing power consumption of the receiver system comprises steps of: providing a signal receiver module; intermittently enabling/disabling the signal receiver module when a microprocessor is in a sleep mode; detecting whether the signal receiver module receives a signal when the signal receiver module is enabled; and waking the microprocessor up to decode the received signal if the signal receiver module receives the signal.

4 Claims, 6 Drawing Sheets

| Parameter | Symbol | Test Conditions | Min | Typ | Max | Unit |
|---|---|---|---|---|---|---|
| Operating Voltage | Vcc | | 2.7 | | 5.5 | V |
| Receiving distance | L | LSIR = 300MA (test signal) | 10 | 15 | | M |
| Carrier Frequency | f0 | | 38K | | | HZ |
| Acceptance angle | θ1/2 | Distance attenuation 1/2 | | +/-35 | | Deg |
| BMP width | FBW | -3Db andwidth | 2 | 3.3 | 5 | kHz |
| Quiescent Current | Icc | When there is no signal input | | 0.8 | 1.5 | mA |
| Low output | VOL | Vin = 0V Vcc = 5V | | 0.2 | 0.4 | V |
| High-level output | VOH | Vcc = 5V | 4.5 | | | V |
| The output pulse width | TPWL | Vin = 500μVp-p ※ | 500 | 600 | 700 | μs |
| | TPWH | Vin = 50mVp-p ※ | 500 | 600 | 700 | μs |

FIG. 1
(Prior Art)

| Parameter | Symbol | Conditions | | Min. | Typ. | Max. | Unit |
|---|---|---|---|---|---|---|---|
| Supply voltage | Vcc | | | 2.4 | 3.5 | 6.0 | V |
| Current Consumption | Icc | Input Signal = 0 | | | 0.7 | 1.3 | mA |
| Reception Distance | d | 200±5Lux | Vcc=3V | 10 | 16 | | m |
| | | | Vcc=2.4V | 7 | 10 | | m |
| Half Angle | Δθ | | | | ±45 | | deg |
| B.P.F. Center Frequency | Fo | | | | 37.9 | | kHz |
| Peak Wavelength | λp | | | | 940 | | nm |
| Signal Output | So | | | --- Active Low --- | | | |
| High Level Output Voltage | Voh | | | Vcc-0.5 | | | V |
| Low Level Output Voltage | Vol | | | | 0.2 | 0.4 | V |
| High Level Pulse Width | Twh | Burst Wave = 600μs | | 500 | 600 | 700 | μs |
| Low Level Pulse Width | Twl | | | 500 | 600 | 700 | μs |

RECEIVER CIRCUIT WITH LOW POWER CONSUMPTION AND METHOD FOR REDUCING POWER CONSUMPTION OF RECEIVER SYSTEM

BACKGROUND OF THE INVENTION

Field of the Invention

The present invention relates to the technology of a receiver, and more particularly to a receiver circuit with low power consumption and a method for reducing power consumption of a receiver system.

Description of the Related Art

Figure 1:
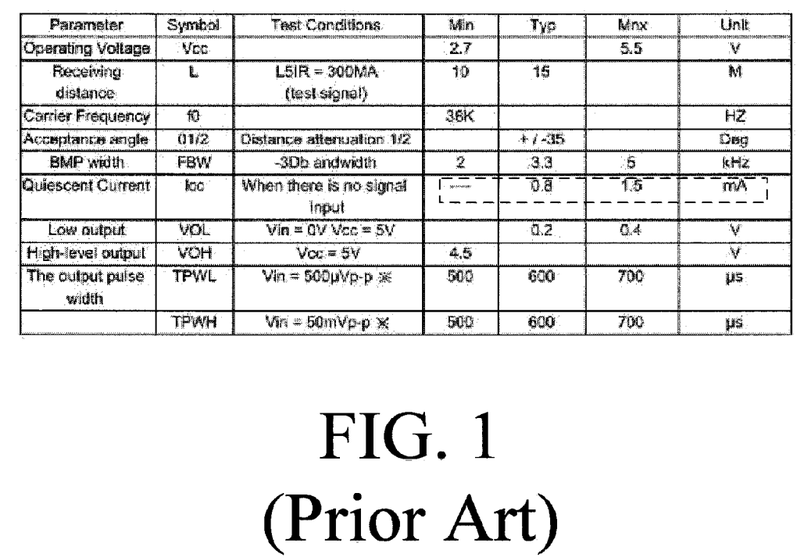
FIG. 1 shows a specification of a commonly used infrared receiver module TL1838.
Figure 2:
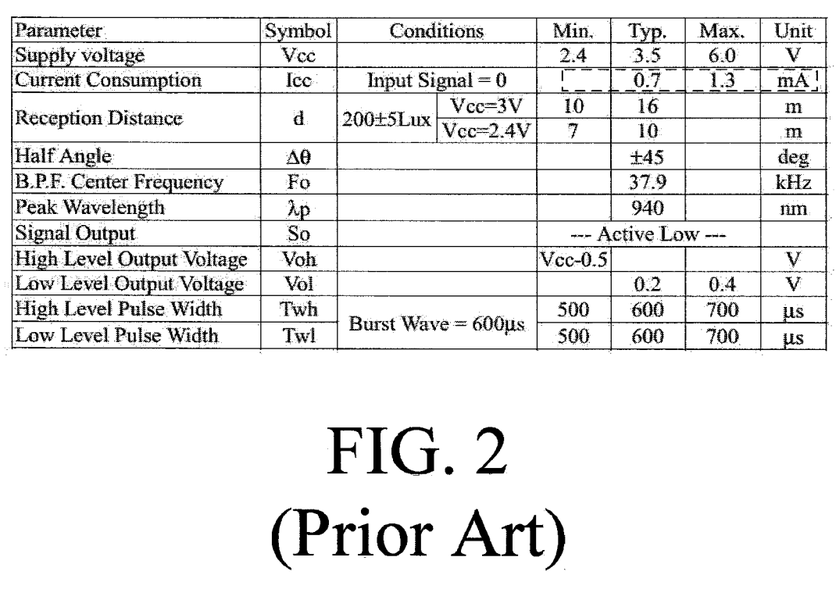
FIG. 2 shows a specification of another commonly used infrared receiver module 2060SMB.

The infrared ray allows the technology of transmitting data on a non-visible spectrum within the transmission range of about 10 meters, and is widely used in the remote control field, such as televisions or toy remote control vehicles or the like, in the modern society. Generally, an infrared (IR) receiver module is seldom used in the battery device. If it is used, it usually has a physical key for wake-up. The reason resides in that the standby current of the infrared receiver module is usually not very low. FIG. 1 shows a specification of a commonly used infrared receiver module TL1838. Referring to FIG. 1, symbol 101 denotes a current when no signal is present. FIG. 2 shows a specification of another commonly used infrared receiver module 2060SMB. Referring to FIG. 2, symbol 201 denotes a current when no signal is present. As shown in FIGS. 1 and 2, an operating current of the commonly used infrared receiver module is usually several hundreds of uA when no signal is received.

If the infrared receiver module has to reach the low power consumption, an infrared receiver module with low power consumption can be selected. For example, some modules of Sharp Corporation may have the current of about 200 uA, but the costs thereof are high. In addition, designers can also choose to use the complementary metal oxide semiconductor to build their own infrared receiver circuit. However, the program is disadvantageous to the production.

SUMMARY OF THE INVENTION

An objective of the present invention is to provide a receiver circuit with low power consumption and a method for reducing power consumption of a receiver system to achieve the effects of saving the powers of both a microprocessor and a receiver circuit.

In view of this, the present invention provides a receiver circuit with low power consumption. The receiver circuit with low power consumption comprises a signal receiver module, an intermittent enabling module, a microprocessor and a wake-up circuit. The signal receiver module comprises a power terminal and a signal output terminal. The intermittent enabling module comprises an output terminal for outputting an enable signal to the power terminal of the signal receiver module. When the enable signal is enabled, the signal receiver module is enabled. The microprocessor comprises an input-output port and a wake-up port, wherein the input-output port of the microprocessor is coupled to the signal output terminal of the signal receiver module, and the microprocessor decodes a signal outputted from the signal output terminal of the signal receiver module. The wake-up circuit comprises a first input terminal, a second input terminal and an output terminal, wherein the first input terminal of the wake-up circuit is coupled to the signal output terminal of the signal receiver module, the second input terminal of the wake-up circuit is coupled to the output terminal of the intermittent enabling module, and the output terminal of the wake-up circuit is coupled to the wake-up port of the microprocessor. When the microprocessor is in a power sleep mode, and the enable signal outputted from the intermittent enabling module is enabled, the wake-up circuit judges whether its first input terminal receives the signal outputted from the signal receiver module. If the first input terminal of the wake-up circuit receives the signal, the wake-up circuit wakes the microprocessor up.

In the receiver circuit with low power consumption according to the preferred embodiment of the present invention, the signal receiver module includes an infrared receiver module. The infrared receiver module includes a signal output terminal, a power terminal and a ground terminal, wherein the ground terminal of the infrared receiver module is coupled to a common voltage. Further, the wake-up circuit includes a first transistor and an impedance element. The first transistor includes a base, an emitter and a collector, wherein the base of the first transistor is coupled to the signal output terminal of the signal receiver module and the first input terminal of the wake-up circuit, the emitter of the first transistor is coupled to the power terminal of the signal receiver module and the second input terminal of the wake-up circuit, and the collector of the first transistor is coupled to the output terminal of the wake-up circuit. The impedance element includes a first terminal and a second terminal, wherein the first terminal of the impedance element is coupled to the collector of the first transistor and the output terminal of the wake-up circuit, and the second terminal of the impedance element is coupled to the common voltage.

In the receiver circuit with low power consumption according to the preferred embodiment of the present invention, the impedance element includes a resistor and a capacitor. The resistor includes a first terminal and a second terminal, wherein the first terminal of the resistor is coupled to the collector of the first transistor and the output terminal of the wake-up circuit, and the second terminal of the resistor is coupled to the common voltage. The capacitor includes a first terminal and a second terminal, wherein the first terminal of the capacitor is coupled to the collector of the first transistor and the output terminal of the wake-up circuit, and the second terminal of the capacitor is coupled to the common voltage.

In the receiver circuit with low power consumption according to the preferred embodiment of the present invention, the intermittent enabling module outputs a pulse width modulation (PWM) signal, wherein the signal receiver module is enabled when the PWM signal is in a first state, and the signal receiver module is disabled when the PWM signal is in a second state, wherein power consumption of the signal receiver module is adjusted by adjusting a ratio of a time of the first state of the PWM signal to a time of the second state of the PWM signal.

The present invention further provides a method for reducing power consumption of a receiver system, the method includes: providing a signal receiver module; intermittently enabling/disabling the signal receiver module when a microprocessor is in a sleep mode; detecting whether the signal receiver module receives a signal when the signal receiver module is enabled; and waking the microprocessor up to decode the received signal if the signal receiver module receives the signal. Moreover, in a preferred embodiment, the signal receiver module is an infrared receiver module.

The spirit of the present invention is to add an additional intermittent enabling module in addition to the signal receiver module. When the microprocessor is in a sleep mode state, the above-mentioned signal receiver module is intermittently enabled, and the microprocessor that can be woken up is designed through the circuit design. When the signal enabling module is intermittently enabled and the signal is received, it immediately enables the microprocessor, which starts to receive and decode the signal. Accordingly, in addition to the power-saving caused by the intermittent enabling of the signal receiver module, the microprocessor may also achieve the effect of power-saving when the signal is not received.

The present invention will become more fully understood from the detailed description given hereinbelow and the accompanying drawings which are given by way of illustration only, and thus are not limitative of the present invention.

DETAILED DESCRIPTION OF THE INVENTION

Figure 3:
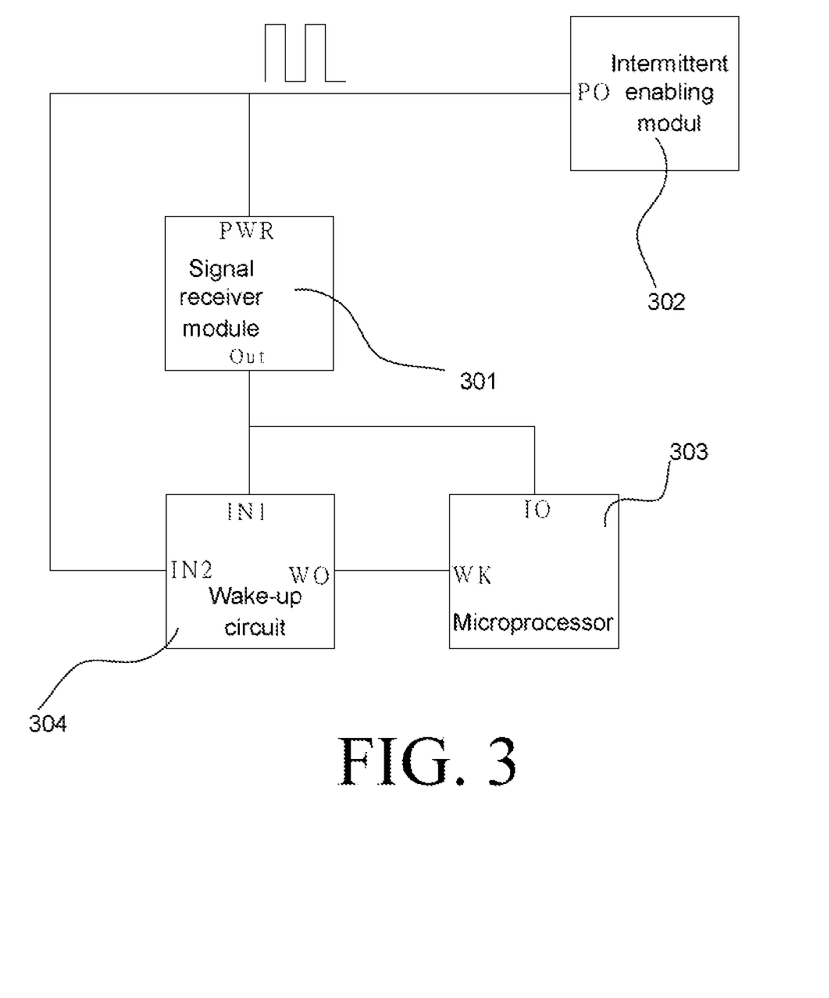
FIG. 3 is a circuit block diagram showing a receiver circuit with low power consumption according to a preferred embodiment of the present invention.

FIG. 3 is a circuit block diagram showing a receiver circuit with low power consumption according to a preferred embodiment of the present invention. Please refer to FIG. 3, the receiver circuit with low power consumption comprises a signal receiver module 301, an intermittent enabling module 302, a microprocessor 303 and a wake-up circuit 304. The signal receiver module 301 comprises a power terminal PWR and a signal output terminal Out. The intermittent enabling module 302 comprises an output terminal PO for outputting an enable signal PW to the power terminal PWR of the signal receiver module 301. The microprocessor 303 comprises an input-output port IO and a wake-up port WK, wherein the input-output port IO of the microprocessor 303 is coupled to the signal output terminal Out of the signal receiver module 301 and the microprocessor 303 decodes a signal outputted from the signal output terminal Out of the signal receiver module 301. The wake-up circuit 304 comprises a first input terminal IN1, a second input terminal IN2 and an output terminal WO. The first input terminal IN1 of the wake-up circuit 304 is coupled to the signal output terminal Out of the signal receiver module 301, the second input terminal IN2 of the wake-up circuit 304 is coupled to the output terminal PO of the intermittent enabling module 302, and the output terminal WO of the wake-up circuit 304 is coupled to the wake-up port WK of the microprocessor 303.

Figure 4:
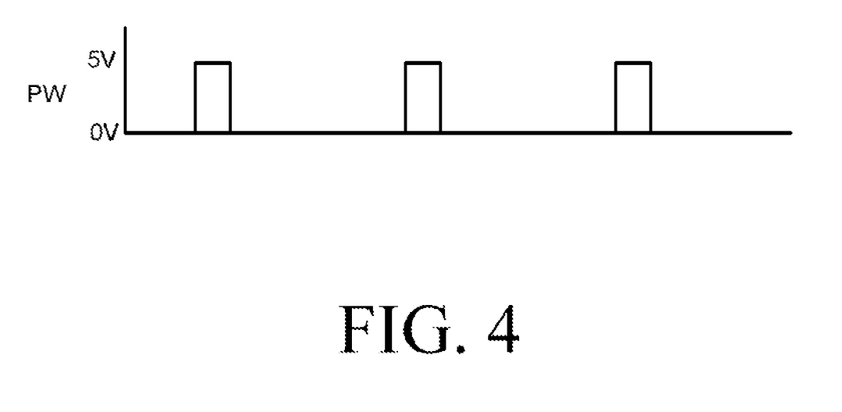
FIG. 4 is a waveform chart showing an enable signal PW according to a preferred embodiment of the present invention.

In the prior art, the signal receiver module is generally normally enabled. In this embodiment, the signal receiver module 301 is enabled in a time-division manner. For example, it is assumed that the enable signal PW may be a pulse, as shown in FIG. 4. FIG. 4 is a waveform chart showing the enable signal PW according to a preferred embodiment of the present invention. Please refer to FIG. 4, when the enable signal PW is 5V, for example, the power terminal PWR of the signal receiver module 301 receives 5V and is enabled. When the enable signal PW is switched from 5V to 0V, the power terminal PWR of the signal receiver module 301 is disabled due to the power lost.

In order to achieve the objective of the standby power-saving more effectively, the microprocessor 303 can enter a power sleep mode in this embodiment. In this embodiment, the wake-up circuit 304 is additionally used to wake the microprocessor 303 up. When the microprocessor 303 is in the power sleep mode and the enable signal outputted from the intermittent enabling module 302 is enabled, the wake-up circuit 304 judges whether its first input terminal receives the signal outputted from the signal receiver module 301. Generally speaking, when the signal receiver module 301 receives the signal, its signal output terminal Out can output the signal. If the first input terminal IN1 of the wake-up circuit 304 receives the signal, then the wake-up circuit 304 wakes the microprocessor 303 up. At this time, the intermittent enabling module 302 is disabled, and the microprocessor 303 supplies power to the signal receiver module 301, so that the signal receiver module 301 keeps in a normal operation, and the microprocessor 303 starts to decode the signal of the signal output terminal Out of the signal receiver module 301.

Figure 5:
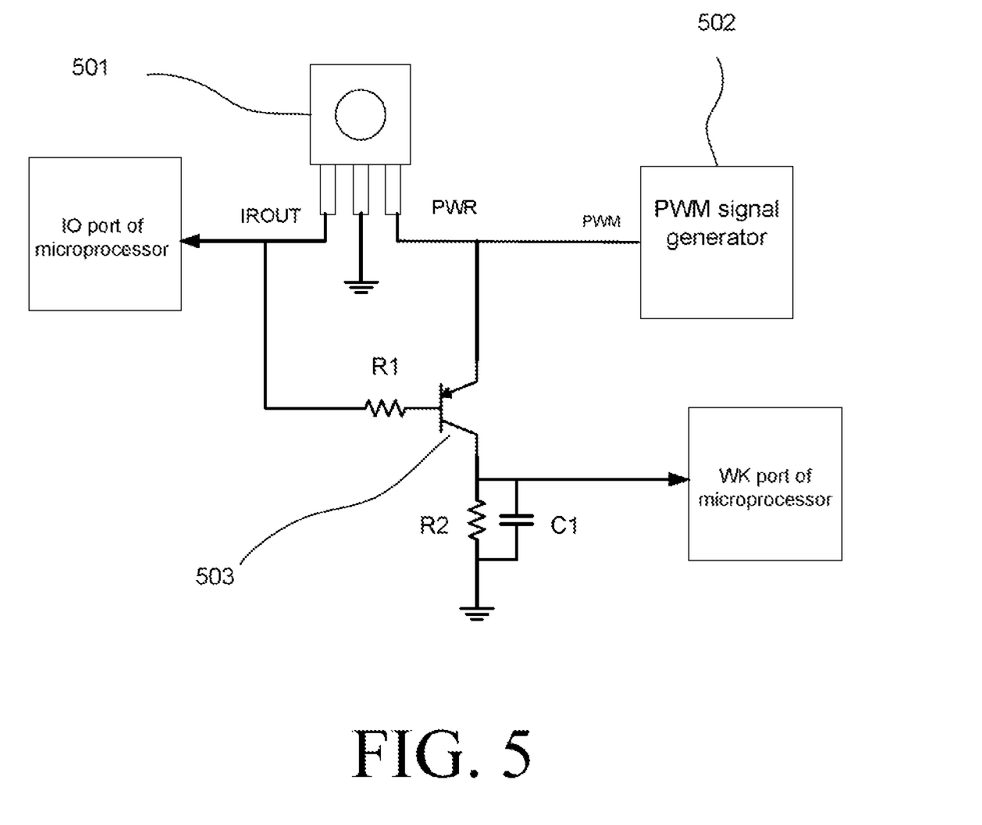
FIG. 5 is a circuit diagram showing a receiver circuit with low power consumption according to a preferred embodiment of the present invention.

FIG. 5 is a circuit diagram showing a receiver circuit with low power consumption according to a preferred embodiment of the present invention. Please refer to FIG. 5 in this embodiment, an infrared receiver module 501 serves as an embodiment of the signal receiver module 301. A pulse width modulation (PWM) signal generator 502 serves as an example of the intermittent enabling module 302. Furthermore, the wake-up circuit 304 is implemented by a P-type bipolar transistor 503 in combination with a first resistor R1, a second resistor R2 and a first capacitor C1.

Figure 6:
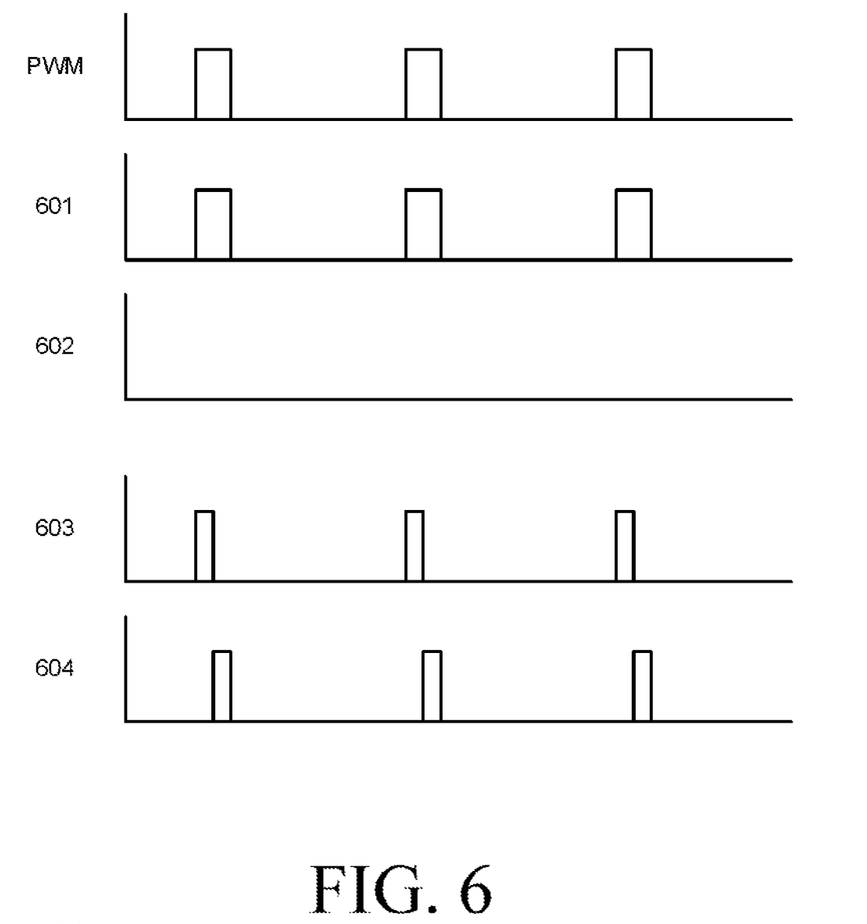
FIG. 6 is an operation waveform chart showing a receiver circuit with low power consumption according to a preferred embodiment of the present invention.

FIG. 6 is an operation waveform chart showing a receiver circuit with low power consumption according to a preferred embodiment of the present invention. Please refer to FIG. 6, symbol PWM denotes the pulse outputted from the PWM signal generator 502; symbol 601 denotes the signal outputted from the signal output terminal IROUT of the infrared receiver module 501 when the infrared receiver module 501 does not receive the infrared signal; symbol 602 denotes the signal outputted from a collector (wake-up circuit 304) of the P-type bipolar transistor 503 when the infrared receiver module 501 does not receive the infrared signal; symbol 603 denotes the signal outputted from the signal output terminal IROUT of the infrared receiver module 501 when the infrared receiver module 501 receives the infrared signal; and symbol 604 denotes the signal outputted from a collector (wake-up circuit 304) of the P-type bipolar transistor 503 when the infrared receiver module 501 receives the infrared signal.

When the microprocessor 303 is in the sleep mode, the PWM signal generator 502 starts to output the pulse PWM of 5V to the power terminal PWR of the infrared receiver module 501. At this time, the infrared receiver module 501 is enabled when the pulse PWM has a logic high voltage, and the infrared receiver module 501 is disabled when the pulse PWM has a logic low voltage. Therefore, the infrared receiver module 501 has power consumption only when the pulse PWM has the logic high voltage. If the pulse PWM has the logic high voltage and the infrared receiver module 501 does not receive the signal, then the signal output terminal IROUT of the infrared receiver module 501 outputs a high voltage pulse (as shown by the waveform 601 in FIG. 6). Because a base of the P-type bipolar transistor 503 is coupled to the signal output terminal IROUT of the infrared receiver module 501, an emitter and the collector of the P-type bipolar transistor 503 are disconnected from each other. The wake-up port WK of the microprocessor 303 keeps the low voltage, so the microprocessor 303 keeps in the sleep state.

If the pulse PWM has the logic high voltage, and the infrared receiver module 501 receives the signal, then the signal output terminal IROUT of the infrared receiver module 501 firstly outputs the logic high voltage when been enabled, and then outputs the logic low voltage (as shown by the waveform 603). Because the base of the P-type bipolar transistor 503 is coupled to the signal output terminal IROUT of the infrared receiver module 501, the emitter and the collector of the P-type bipolar transistor 503 are electrically connected to each other. So, the collector of the P-type bipolar transistor 503 outputs the logic high voltage (as shown by the waveform 604). The wake-up port WK of the microprocessor 303 receives the high voltage, so the microprocessor 303 switches from the sleep state to the normal operation. At this time, the microprocessor 303 normally supplies power to the power terminal PWR of the infrared receiver module 501, and starts to decode the signal outputted from the signal output terminal IROUT of the infrared receiver module 501.

Figure 7:
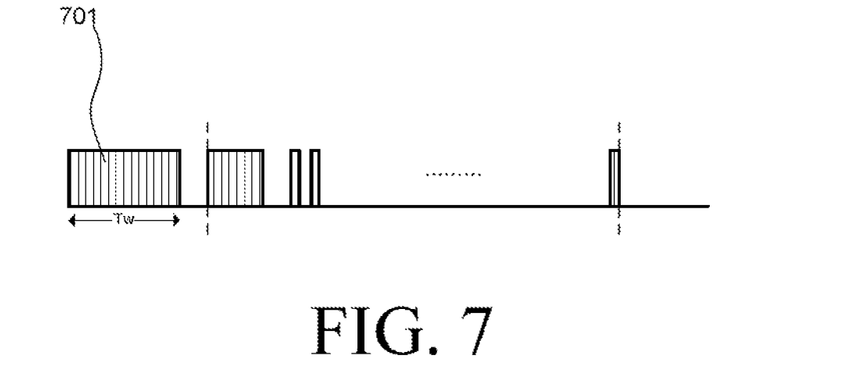
FIG. 7 is a waveform chart showing a wake-up pulse train according to a preferred embodiment of the present invention.

As can be seen from the above-mentioned FIG. 6, when the duty cycle of the pulse outputted from the PWM signal generator 502 is lower, the average power consumption of the infrared receiver module 501 is lower. However, since the output and the input of the infrared receiver module 501 itself have a delay time ranging from 500 us to 1000 us, the duty cycle of the pulse outputted from the PWM signal generator 502 needs to be longer than the above-mentioned delay time upon designing. Furthermore, in order to wake the microprocessor 303 up successfully, a wake-up pulse train is preferably added to an infrared emitting signal transmitted by the transmitter, as shown in FIG. 7. FIG. 7 is a waveform chart showing the wake-up pulse train according to a preferred embodiment of the present invention. Please refer to FIG. 7, the emission time of a wake-up pulse train 701 is preferably longer than the cycle of the pulse PWM according to the design consideration. Ideally, the time Tw of the wake-up pulse train 701 is preferably designed to be 1.5 to 2 times of the cycle of the pulse PWM. After successfully waking the microprocessor 303 up, the microprocessor 303 can decode the remaining infrared signals.

The applicant takes an actual measurement using TL1838. When the duty cycle of the PWM signal is configured as 24/255, the logic high voltage time of the PWM signal is 750 us, and the consumed current of the overall system is 72 uA after the actual measurement. When the duty cycle of the PWM signal is continuously shortened and the logic high voltage time of the PWM signal is shorter than 600 us, the infrared receiver module 501 has no output. The applicant records the above-mentioned measurement process into a film, as attached. Please refer to the attachment submitted by the applicant.

Figure 8:
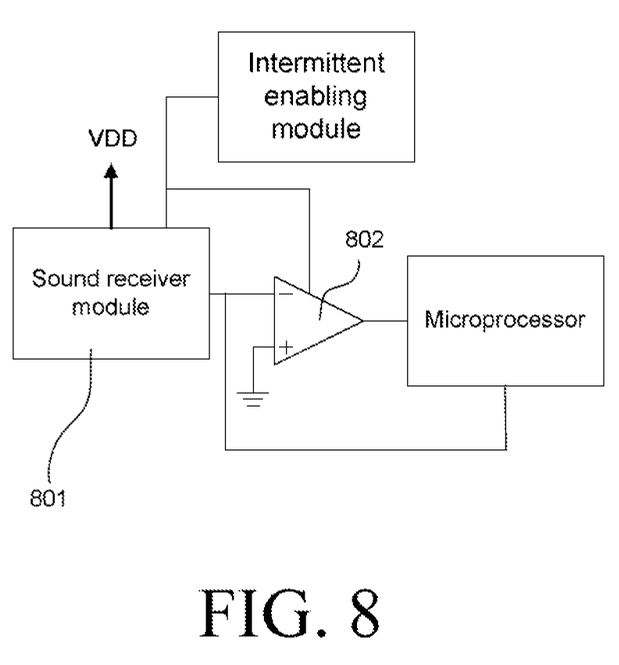
FIG. 8 is a circuit block diagram showing a receiver circuit with low power consumption according to a preferred embodiment of the present invention.

Although the above-mentioned embodiment is exemplified by the infrared receiver module 501, those skilled in the art should know that a modified receiver module may also be implemented. FIG. 8 is a circuit block diagram showing a receiver circuit with low power consumption according to a preferred embodiment of the present invention. Please refer to FIG. 8 of this embodiment, the original infrared receiver module 501 is modified into a sound receiver module 801 which may be a microphone. Similarly, using the mode of the present invention, an intermittent enabling module 302 is used to control the electric power supplied to the sound receiver module 801 and an amplifier 802, so the effect of power-saving can be achieved. Therefore, the present invention is not limited to the infrared receiver module 501.

Figure 9:
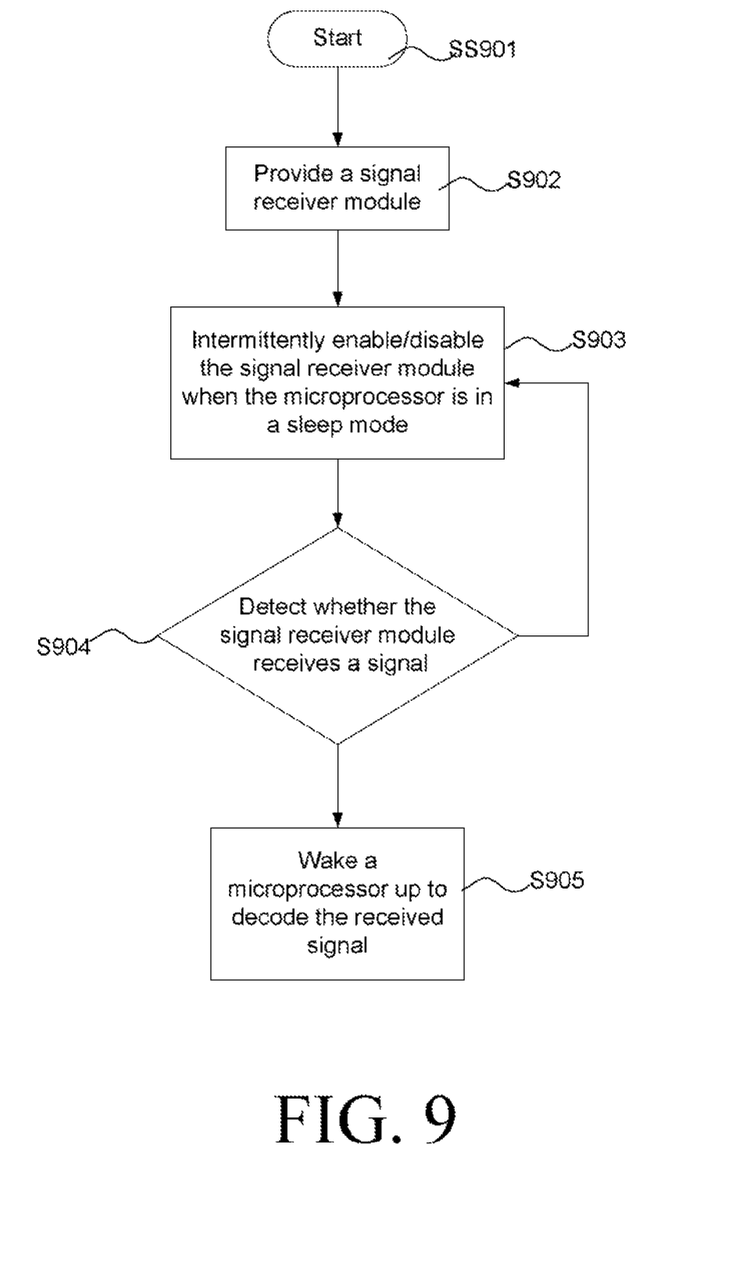
FIG. 9 is a flow chart showing a method for reducing power consumption of a receiver system according to a preferred embodiment of the present invention.

The above-mentioned embodiments can be summarized as a method for reducing power consumption of a receiver system. FIG. 9 is a flow chart showing a method for reducing power consumption of a receiver system according to a preferred embodiment of the present invention. Please refer to FIG. 9, the method for reducing power consumption of the receiver system comprises the following steps.

In step S901, the method starts.

In step S902, a signal receiver module, such as an infrared receiver module in this application, is provided.

In step S903, the signal receiver module is intermittently enabled/disabled when a microprocessor is in a sleep mode.

In step S904, whether the signal receiver module receives a signal is detected when the signal receiver module is enabled.

In step S905, the microprocessor is woken up to decode the received signal if the signal receiver module receives the signal.

In summary, the spirit of the present invention is to add an additional intermittent enabling module in addition to the signal receiver module. When the microprocessor is in a sleep mode state, the above-mentioned signal receiver module is intermittently enabled, and the microprocessor that can be woken up is designed through the circuit design. When the signal enabling module is intermittently enabled and the signal is received, it immediately enables the microprocessor, which starts to receive and decode the signal. Accordingly, in addition to the power-saving caused by the intermittent enabling of the signal receiver module, the microprocessor may also achieve the effect of power-saving when the signal is not received.

While the present invention has been described by way of examples and in terms of preferred embodiments, it is to be understood that the present invention is not limited thereto. To the contrary, it is intended to cover various modifications. Therefore, the scope of the appended claims should be accorded the broadest interpretation so as to encompass all such modifications.

What is claimed is:

1. A receiver circuit with low power consumption, comprising:
 a signal receiver module comprising a power terminal and a signal output terminal;
 an intermittent enabling module comprising an output terminal and outputting an enable signal to the power terminal of the signal receiver module, wherein when the enable signal is enabled, the signal receiver module is enabled;

a microprocessor comprising an input-output port and a wake-up port, wherein the input-output port of the microprocessor is coupled to the signal output terminal of the signal receiver module, and the microprocessor decodes a signal outputted from the signal output terminal of the signal receiver module; and a wake-up circuit comprising a first input terminal, a second input terminal and an output terminal, wherein the first input terminal of the wake-up circuit is coupled to the signal output terminal of the signal receiver module, the second input terminal of the wake-up circuit is coupled to the output terminal of the intermittent enabling module, and the output terminal of the wake-up circuit is coupled to the wake-up port of the microprocessor;

wherein when the microprocessor is in a power sleep mode and the enable signal outputted from the intermittent enabling module is enabled, the wake-up circuit judges whether the first input terminal of the wake-up circuit receives the signal outputted from the signal receiver module; and wakes up the microprocessor if the first input terminal of the wake-up circuit receives the signal.

2. The receiver circuit with low power consumption according to claim 1, wherein the signal receiver module comprises:

an infrared receiver module comprising a signal output terminal, a power terminal and a ground terminal, wherein the ground terminal of the infrared receiver module is coupled to a common voltage;

wherein the wake-up circuit comprises:

a first transistor comprising a base, an emitter and a collector, wherein the base of the first transistor is coupled to the signal output terminal of the signal receiver module and the first input terminal of the wake-up circuit, the emitter of the first transistor is coupled to the power terminal of the signal receiver module and the second input terminal of the wake-up circuit, and the collector of the first transistor is coupled to the output terminal of the wake-up circuit; and an impedance element comprising a first terminal and a second terminal, wherein the first terminal of the impedance element is coupled to the collector of the first transistor and the output terminal of the wake-up circuit, and the second terminal of the impedance element is coupled to the common voltage.

3. The receiver circuit with low power consumption according to claim 2, wherein the impedance element comprises:

a resistor comprising a first terminal and a second terminal, wherein the first terminal of the resistor is coupled to the collector of the first transistor and the output terminal of the wake-up circuit, and the second terminal of the resistor is coupled to the common voltage; and a capacitor comprising a first terminal and a second terminal, wherein the first terminal of the capacitor is coupled to the collector of the first transistor and the output terminal of the wake-up circuit, and the second terminal of the capacitor is coupled to the common voltage.

4. The receiver circuit with low power consumption according to claim 1, wherein the intermittent enabling module outputs a pulse width modulation (PWM) signal, wherein the signal receiver module is enabled when the PWM signal is in a first state, and the signal receiver module is disabled when the PWM signal is in a second state, wherein power consumption of the signal receiver module is adjusted by adjusting a ratio of a time of the first state of the PWM signal to a time of the second state of the PWM signal.

* * * * *